B. KERN, Jr.
DUST COLLECTOR.
APPLICATION FILED AUG. 5, 1913.

1,288,614.

Patented Dec. 24, 1918.
6 SHEETS—SHEET 1.

Fig. 1.

Witnesses:
Jas. E. Hutchinson
G. W. Marvin

Inventor:
Bernard Kern, Jr.
By Means
Attorneys

Fig. 2

UNITED STATES PATENT OFFICE.

BERNARD KERN, JR., OF SANDUSKY, OHIO.

DUST-COLLECTOR.

1,288,614. Specification of Letters Patent. Patented Dec. 24, 1918.

Application filed August 5, 1913. Serial No. 783,220.

*To all whom it may concern:*

Be it known that I, BERNARD KERN, Jr., a citizen of the United States, residing at Sandusky, in the county of Erie and State of Ohio, have invented certain new and useful Improvements in Dust - Collectors, of which the following is a specification, reference being had therein to the accompanying drawing.

This invention relates to an improvement in dust collectors which, though capable of a variety of uses, is particularly designed for employment in connection with street sweeping apparatus, particularly where such apparatus utilizes air for lifting or conveying the refuse being collected.

In an apparatus of the character stated, by reason of the fact that the same must be of a portable character to permit traversing the streets of populated districts, an essential desideratum is the ultimate deliverance of the air from the machine in a purified state, so far as the separation of the dust, of which the air is laden during the operation of the machine, is concerned, and which air is necessarily discharged from the machine into the atmosphere.

It is also desirable that the air emitted from the machine, usually in a somewhat severe blast, should not be laterally of the traveling apparatus, but rather vertically above the machine.

Practical experience has demonstrated the great difficulty encountered in purifying the air, as suggested, and to provide a separator which will be capable of treating the vast amount of material and corresponding volume of air, in a continuous operation, and for freeing and properly discharging the clean air from the machine. To these ends I have found that a movable collector operating to successively present to the dust-laden air fresh collecting surfaces and for simultaneously cleaning other dust-coated surfaces in a practical and efficient device operating, preferably, in conjunction with a filter through which the air initially treated by the main separator is forced to pass and through the medium of which filter any minute particles of dust escaping said separator will be taken from the air so that the latter at its final discharge into the atmosphere is substantially pure from dust.

A separator, and filter, as above set forth possess many important features in detail, construction and arrangement, found efficacious in service, among which may be broadly observed:—first, the rotatable character of the separator comprising radially disposed supporting members of an open mesh material, for example, wire, for a multitude of corresponding radial layers or folds of filtering cloth, associated with an improved means for mounting and maintaining the proper association of the elements; second, improved means for actuating or agitating the folds or layers of filtering cloth to cause them to free themselves of collected dust with which the same may be coated to enable the presentation of fresh or clean portions of the separator to incoming dust-laden air, and means enabling proper mounting and adjustability of such actuating means; third, an improved character or formation of filter cloth enabling the same to be flapped, so to speak, that is, in the sense that the same is alternately rendered slack or full and in a snappy or jerky manner returned to a normally taut condition, embracing the provision of the filter cloth with reinforcing material of a relatively non-stretchable quality adapted to be engaged by the means for jerking or snapping the filter cloth in its return to its tautened state; fourth, improved means for sealing the space between the rotatable dust separator and its frame to prevent dust working out of the machine, so that only the purified air is free to escape, and that only through the predetermined final outlet afforded for that purpose; and fifth, an improved filter capable of arresting the before referred to finer particles of dust escaping with the air from the separator, arranged adjacent to the final outlet for the purified air, and embracing a simple formation, and means for movably assembling the parts for facilitating the cleaning and substitution of parts at the will of the operator. Other features not here especially mentioned will be apparent to persons skilled in the art from the detail description hereinafter contained when read in connection with the accompanying drawings forming part hereof, and wherein, for the purpose of assisting in the imparting of a full and clear understanding of the invention, I have illustrated the preferred embodiment of my invention.

In the drawings:—

Figs. 9, 10, 11, 12, 13, 14, 15, 16 and 17 are detail views, the character of which it is believed will be readily understood, showing the manner of mounting and securing the outer turns of the filter cloth and the parts immediately associated therewith.

Referring more specifically to the drawings, wherein like reference characters designate corresponding parts in the views, A represents a vehicle either self-propelled or drawn as may be found practical under conditions of service, B indicating the wheels thereof, one at opposite sides of the body or casing C.

D is an inlet into the casing C at the forward upper end of the same through which the dust-laden air is thrown into the interior of the casing, and subjected to the action of a rotatable dust collector, to be more particularly defined; and F is representative of what I might term a dead air chamber into which the dust collected by the collector is shaken and deposited.

At the sides of the casing C, the latter being preferably a wooden receptacle, I provide circular collars G carrying at the lower portions thereof anti-friction rollers $g$ constituting supports for large annular bearings $h$ at the ends of a rotatable dust collector H, and said bearings being formed of metal and bolted as at $h'$ to a metallic ring $h^2$ carried by the ends of the rotary dust collector, and constituting an inner flange to prevent endwise movement of the collector, the bearings $h$ having outwardly extending flanges $h^3$ overlying the members G, and having curved outwardly projecting terminal portions $h^4$ in which is seated a ring of coiled spring metal $h^5$, holding into wiping relation with the curved seat formed by the flange $h^3$ a sheep's wool packing $h^6$ fastened as at $h^7$ to the flanges of the members G as shown. The space between the casing C and the pivotal ends of the dust collector H are thus effectually sealed.

Figure 1:
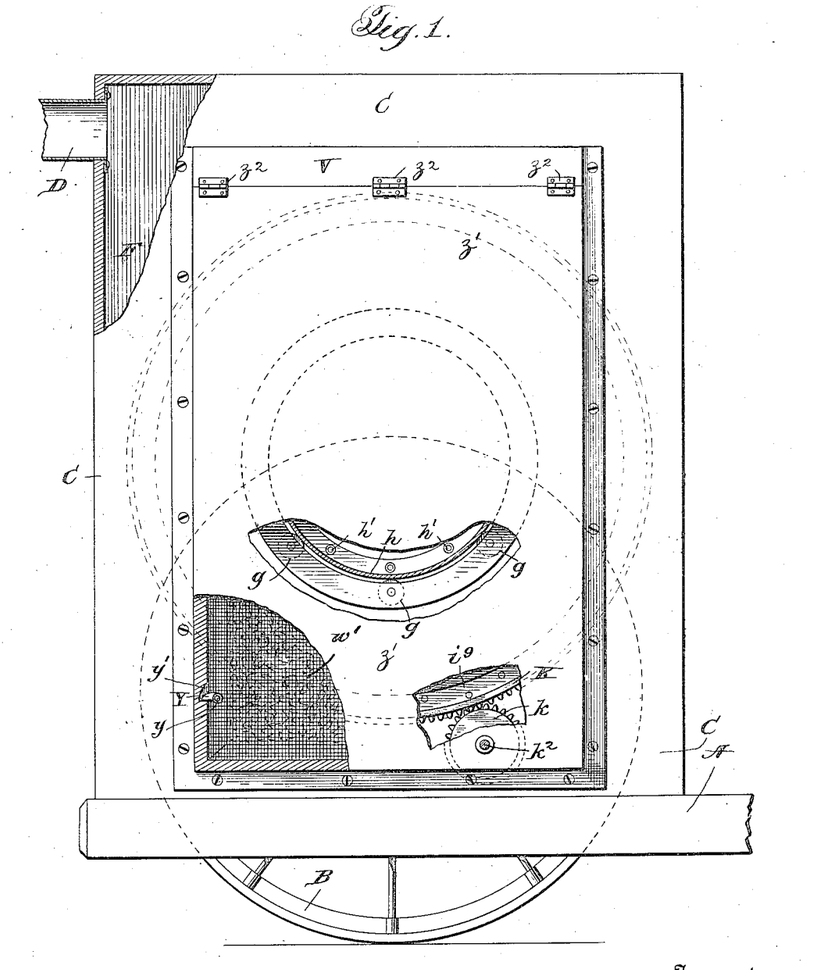
Figure 1 is a side elevation, of a fragmentary portion of a street sweeping machine vehicle, parts being broken away to show the interior formation.
Figure 2:
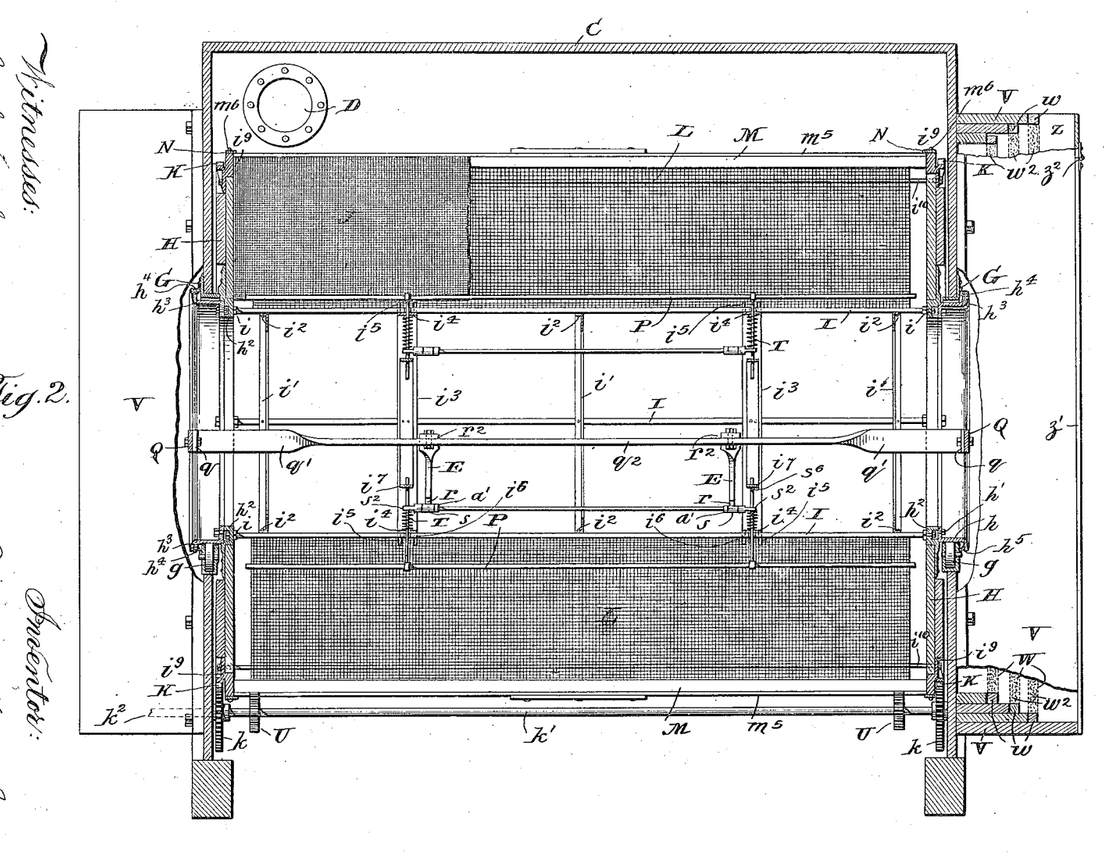
Fig. 2 is a longitudinal vertical sectional view through the dust collector and immediately associated portions of the casing within which the same is mounted.
Figure 3:
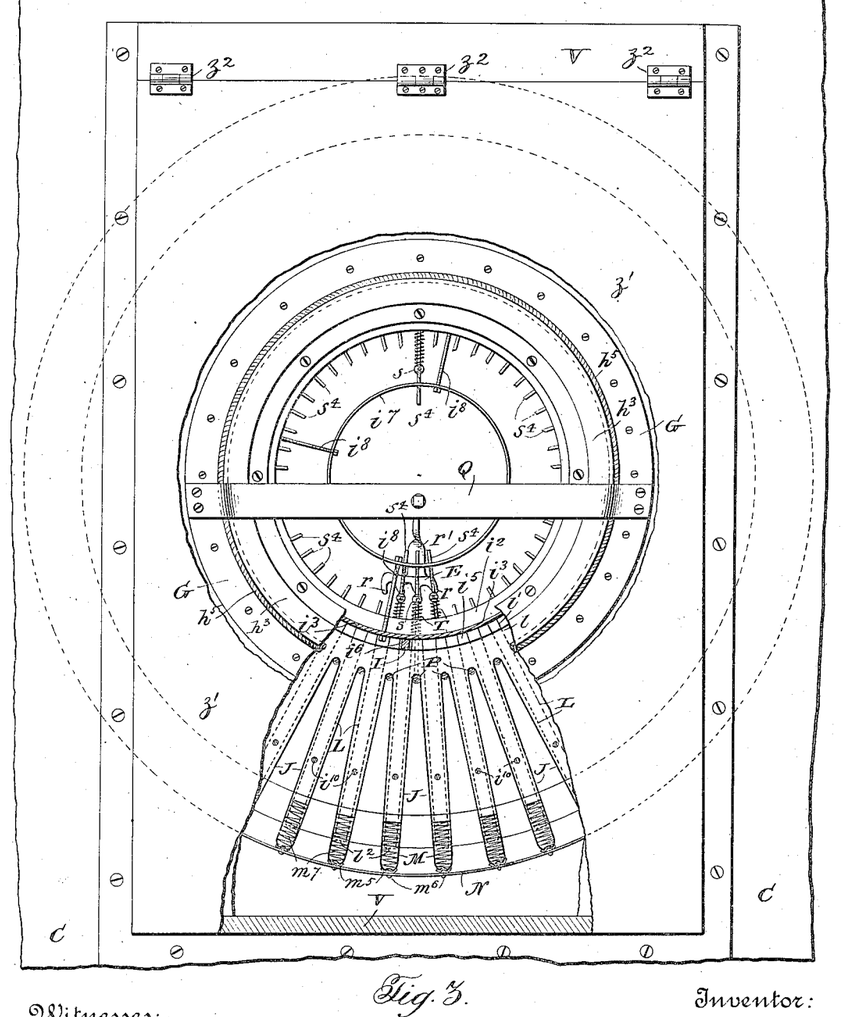
Fig. 3 is a side elevation showing the dust collector partly in section.
Figure 4:
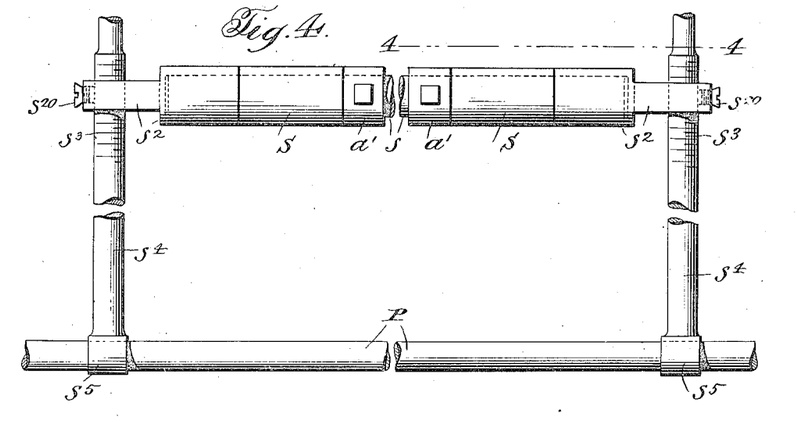
Fig. 4 is an enlarged detail view of the movable means for engaging the inner turns of the filter cloth.
Figure 5:
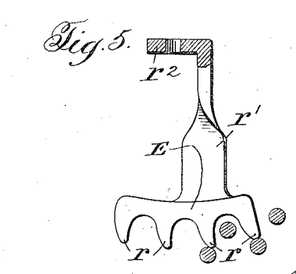
Fig. 5 is a detail view of one of the cams for actuating the device of Fig. 4.
Figure 6:
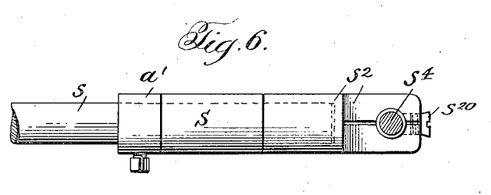
Fig. 6 is an elevation on the line 4—4 of Fig. 4.
Figure 7:
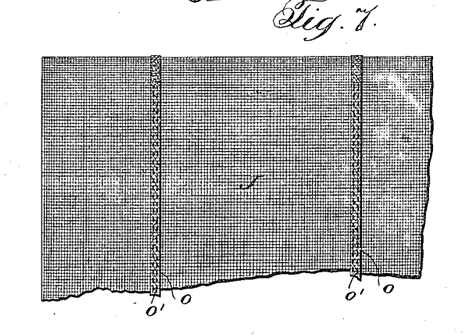
Fig. 7 is a face view of one of the filter folds.
Figure 8:
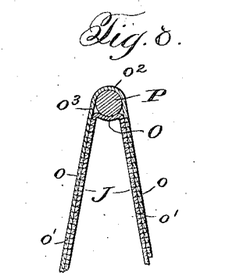
Fig. 8 is a detail view to show the reinforcing tapes of the filter cloth.
Figure 9:
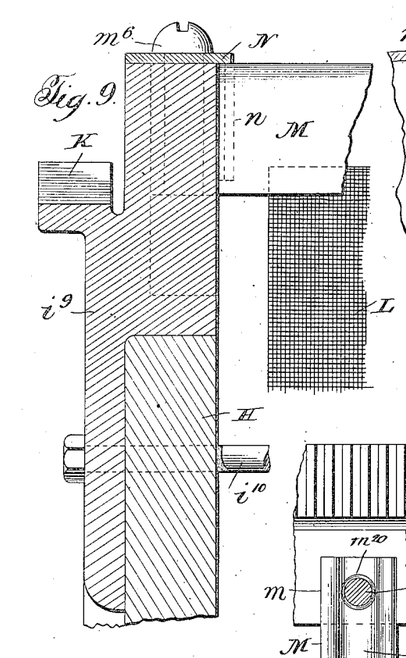
Figure 10:
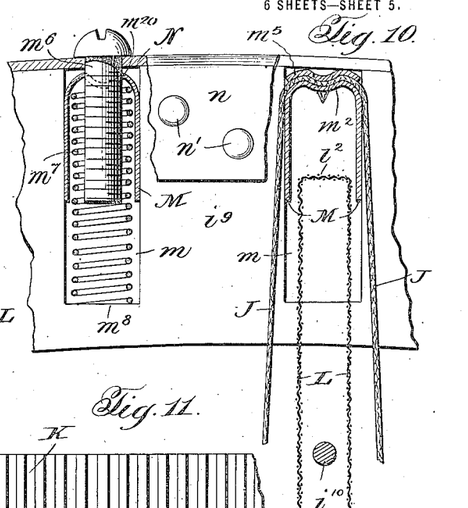
Figure 12:
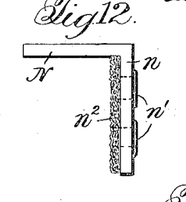
Figure 13:
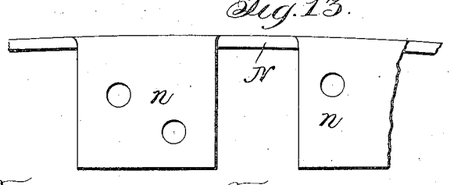
Figures 14, 15:
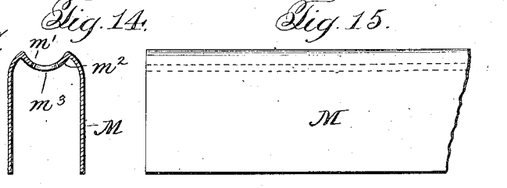
Figures 16, 17:
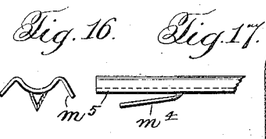
Figure 18:
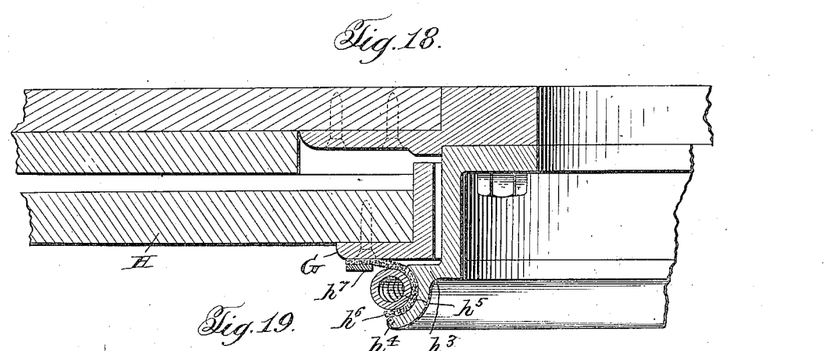
Fig. 18 is a detail sectional view illustrating the manner of sealing the space between the casing and the rotatable dust separator.

Connecting the rings $h^2$ of the dust collector are a series of bars I, the same being rectangular in contour (Fig. 3) for the major portion of their length, and at their ends fastened to the rings as at $i$. Between the ends of the same the bars I are secured to flanged rings $i'$, as at $i^2$, and similarly to a pair of U-shaped rings $i^3$, as at $i^4$, having their flanges $i^5$ disposed outermost to form pockets $i^6$ through which the bars pass and in which they are seated. For a purpose to later appear, rings $i^7$ are arranged concentric to the rings $i^3$, the two being secured together by rods $i^8$. It will be observed that there are three rings $i'$, one at the longitudinal center and the others near the ends of the collector, while there is conveniently but a pair of the U-shaped rings $i^3$, one arranged between the metal ring $i'$ and the end rings $i'$.

The immediate dust collecting and separating means may now be defined, and at the outset it may be observed that the same comprises a multitude of approximately radially disposed folds or sheets of filter cloth suitably supported so as to permit the passage of air therethrough while collecting the dust on the surface thereof, and the folds being actuated so that the collector may be said to be self-cleaning during a continuous cycle of movement of the collector. The folds or sheets of filter cloth are represented at J, the same being conveniently a continuous piece of fabric sufficiently porous to permit the proper passage of air therethrough while preventing dust from passing through the same so that the dust will be collected largely on the outer surface of the cloth, the cloth being folded and refolded upon itself throughout the circumference of the rotary frame constituted by the bearings $h$, bars I, and rings $i'$ and $i^3$, together with suitable heads $i^9$ at opposite ends of the machine and carrying gears K, meshing with pinions $k$ mounted on a common shaft $k'$, driven through the medium of an extension $k^2$ deriving its power from any suitable source, conveniently a driven part of the vehicle in which the collector may be mounted, and not necessary to be illustrated in detail herein.

Between each alternate fold of the collector fabric J, I provide an open mesh support therefor to maintain the desired air space within the interior of the collector, and between said folds, by constantly maintaining said folds in a separated relation independently of the slackened or taut condition of the folds themselves. This open mesh support is formed preferably of wire of considerably greater mesh than the mesh of the cloth J so that while performing its supporting function it will constitute no material barrier to the free ingress of the air. Reference to one of these wire screen supports will suffice for them all, to-wit, L is one of the screen supports, the same being of inverted U-formation, the same being permanently secured in place in a somewhat relatively free condition so that it may have slight play or movement over the inner surface of the cloth J. The free edges of the screen, as at $l$, rest in notched portions $l'$ formed in the flanges $i^5$ of the rings $i^3$ while the upper folded edge $l^2$ of the screen fits slidably within U-shaped bars M seated at its ends in pockets $m$ formed in the heads $i^9$ and bridging the space between said heads. The outer folds of the collector cloth J pass over the outside of the bars M and inwardly over the opposite surfaces of the wire support L—it may be here noted that the space within the folds and wire support is sufficient to accommodate tie rods, as $i^{10}$, to secure the opposite heads $i^9$ together.

The U-shaped bars M are provided with longitudinal grooves along the folded edge of the same constituted by curving the same inwardly as at $m^2$. This curved wall has a series of apertures $m^3$ therein for the reception of pointed tongues $m^4$ depending from an inverted approximately W-shaped locking plate $m^5$, the central portion of which is adapted to seat in the groove $m'$, and by passing the pointed tongues $m^4$ through the folded edge of the collector cloth J, and also through the apertures $m^3$, and shifting the plate longitudinally so that the tongues $m^4$ underlie the imperforate portion of the wall $m^2$, these portions are firmly secured together, the arrangement at the same time offering a simple separable fastening enabling ready renewal of the separator or collector cloth, as desired. The ends of the bars M, project, as stated, into the pockets $m$ formed therefor in the heads $i^9$, said ends being inserted into the pockets in a direction radially of the heads, and held in the pockets by a plate N attached to the head by inturned flanges $n$ secured to the heads as at $n'$, elongated bolts $m^6$ being threaded through the plates N and freely passed through suitable openings $m^{20}$ in the wall $m^2$ of the bars M and depending a sufficient distance to receive thereover springs $m^7$ bearing at their lower ends against the base $m^8$ of the pocket and at their upper ends against the wall $m^2$ of said bars M.

The inturned flanges $n$ referred to extend the full distance between the adjacent pockets and are lined with sheep's wool $n^2$ to prevent the air passing by way of the pockets into the interior of the collector and compel the air to first pass through the separator cloth.

Intermediate of the adjacent wire supporting elements L the inner folds O of the separator cloth are secured to rods P which are adapted to reciprocate radially of the machine, as will soon be defined. The manner of securing the said inner folds to the said rods P is important, and I have conceived of a simple and efficient means to that end, namely, cloth tapes $o$ disposed longitudinally of the fabric of which the collector cloth is formed, and stitched thereto as at $o'$, save at certain full portions $o^2$, coming at the inner folds of the cloth referred to, and constituting eyes or loops $o^3$ for the reception of the rods P to which I have just alluded. Of course, from the usual nature of a filter or separator cloth, the same under stretching strains is capable of and liable to elongate, and thus become unduly loosened relative to the correlated parts of the apparatus, and to overcome this tendency, the tapes $o$ are of a strong character capable of resisting such stretching, and inasmuch as the strain in my apparatus will come upon the tapes, as distinguished from the main body of the separator cloth, per se, the cloth will be preserved in its normal condition.

It being understood that under the rotation of my collector, as thus far defined, the various folds of the collector cloth will be presented in the path of the dust-laden air, introduced into the casing C through the inlet D, the air being permitted to pass through the separator cloth and the supporting screens therefor, into the hollow interior of the rotary collector, and out through the hollow bearings at the ends of the same, the dust being collected on the outer surface of the separator cloth while the heavier refuse carried by the air will be delivered by gravity to the bottom of the casing or receptacle C. Following this operation, it will be apparent, to permit continuous actuation of the apparatus, some means should be employed to free the surface of the collector cloth of the dust carried thereby, and I have demonstrated that this can be best accomplished by jarring or flapping the folds of the collector cloth. This is accomplished through instrumentalities connected to the rods P associated with the inner folds of the collector cloth, as already disclosed. These actuating instrumentalities, automatic in operation, will now be specifically referred to.

Across the ends of the rotatable bearing $h$, and to the flanges G therebeyond I secure a flat metal strip Q to which a longitudinal strip (both being formed of rigid metal) is secured through the medium of the flanges $q$ of the vertically flat end portions $q'$, these end portions being twisted from a horizontally flat central portion $q^2$, said strip, comprising the portions $q'$ and $q^2$, passing through the hollow central portion of the dust connector, and the purpose thereof being to constitute an efficient support for actuating cams E, having a series of cam surfaces or fingers $r$ (four being shown) disposed circumferentially of the machine and formed with the shank $r'$ having the metal thereof twisted to constitute a horizontal flange $r^2$ overlying and bolted to the horizontal supporting strip $q^2$.

The means coöperating with the cams or fingers $r$, the latter being stationary, comprises devices carried by the rotatable collector adapted to be brought into a tripping engagement with the cams, when the collector is passing the lower turn of its revolution, and includes anti-friction rollers S sleeved for free rotation upon rods $s$, and held against longitudinal displacement along said rods by means of a collar $a'$ on one side thereof and an adjustable grip, in the nature of a threaded split collar $s^2$, on the other side thereof, the threaded split collar engaging the complementary threaded end $s^3$ of radially disposed rods $s^4$ connected at their outer ends, as at $s^5$ to the rods P, in turn connected to the looped portions of the tapes $o$ of the separator cloth J, and passing for free movement through suitable perforations $i^6$ in the rings $i^7$ within the U-shaped frame rings $i^3$. Springs T are sleeved upon the intermediate portions of the rods $s^4$ bearing at their outer ends against the web of the U-shaped rings $i^3$ referred to,—and through which the outer portions of the rods pass,—and bearing at their inner ends against the grip collars $s^2$, act normally to thrust and maintain the rods $s$ and the rods $s^4$, rollers S, and parts associated therewith, in their innermost position, so that as the rotary dust collector moves as a whole, the rollers S will come into rapid successive engagement with the trips or cam fingers $r$, and be forced outwardly thereby to successively slacken the cloth sheets, the springs T alternately and similarly successively thrusting the rollers and rods P inwardly into the spaces between the fingers or cams to tauten the sheets, thereby securing the desired flapping of the sheets to clean the same of the dust for their fresh presentation to the incoming dust-laden air. It is to be here noted that the shaking of the filter cloth is at a point within the dead air chamber F so that as the dust separates from the cloth and falls within said chamber it cannot be influenced or interfered with by any current of air within the casing C surrounding the rotary dust collecting element.

The threaded split collars $s^2$ are adapted to be forced open to permit adjustment thereof by conical threaded wedges $s^{20}$. Normally the split collars have a sufficient binding engagement upon the rods $s^4$ to maintain the rods in adjusted position.

Additional agitation of the filter cloth may be accomplished by the use of another cam U (a pair may be employed, at opposite ends of the machine, if desired) supported from the end wall C at the bottom of the same, and arranged in the path of movement of the U-shaped bars M so that the bars may be successively and rapidly depressed inwardly by the cam fingers and similarly, alternately thrust outwardly by the springs $m^7$.

The air passing through the filter cloth J to the interior of the rotary element may, at times, still carry minute particles of dust, and to separate such foreign matter from the dust, so that the latter, when finally emitted from the machine may be as pure and clean as possible, I mount on the outside of the machine at the sides thereof, and inclosing the pivot mountings for said rotatable element, a filter frame V, the same being interiorly of step-like formation to provide the outwardly progressively enlarging seats $v$, $v'$ and $v^2$ for the accommodation of filter sections W of similarly increasing diameters. The filter sections are of like construction, differing only as to size, and are disposed as shown (Fig. 19) to provide vertically disposed collecting spaces X therebetween. Each section comprises a surrounding frame $w$ secured to the opposite surfaces of which are foraminated sheets of material, conveniently of wire gauze $w'$, providing a chamber for the reception of a suitable filter moss $w^2$ capable of arresting the aforesaid minute particles of dust carried by the outgoing air, the latter, of course, being compelled to pass through the various filter sections prior to its final discharge. The moss is prevented from undue displacement within the filter racks by means of wire loops or equivalent ties $w^3$ passing through the moss at a number of points and secured to the foraminated sheets, readily obtained by simply threading the wire through said sheets to constitute loops.

Y (Fig. 20) are gravity dogs or latches pivoted at $y$ to the side members of the filter frames $w$ and adapted to be swung into engagement with the notched portions $y'$ of the end walls of the supporting frame V. Beyond the last of the filter sections an air space Z is provided in the frame V, the same opening to discharge upwardly as at $z$, to prevent the air blast being projected laterally of the machine in the case of a street sweeper, which of course would be objectionable in many respects to persons passing a machine, and merchandise displayed on sidewalks, etc. Access to the space Z as well as to the moss racks is obtained through a front door $z'$ normally closed, as illustrated in full lines, but adapted to be swung open as indicated in dotted lines upon a hinged connection $z^2$. By opening this door, it is apparent that the racks may be properly adjusted in place, the latches Y manipulated to fasten or unfasten the racks, and the racks withdrawn, when desired, to be cleaned and replaced, or others substituted for the same. The smaller rack or racks may at times be withdrawn through the door opening, but the size of the final outlet opening $z$ is such that any or all of the racks may be introduced or withdrawn in a vertical direction therethrough.

Sheep's wool pelt packing, found particularly useful in the dust-sealing of the various portions of my improved collector, is interposed between the filter frames $w$ and their seats $v$, $v'$ and $v^2$, respectively, as indicated at $w^4$.

While I have herein disclosed the preferred embodiment of the invention, it will be understood by persons skilled in the art that said invention is capable of embodiment in other forms, and devices, without departing from the spirit thereof, and as may be in accordance with the hereto appended claims.

Figure 19:
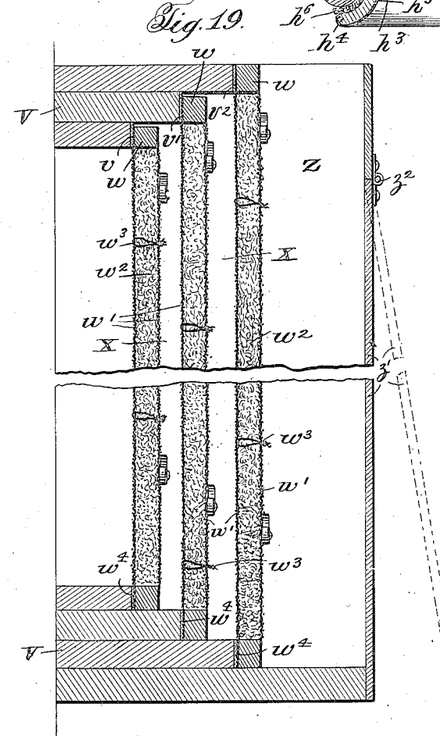
Fig. 19 is a similar view of the filter.
Figure 20:
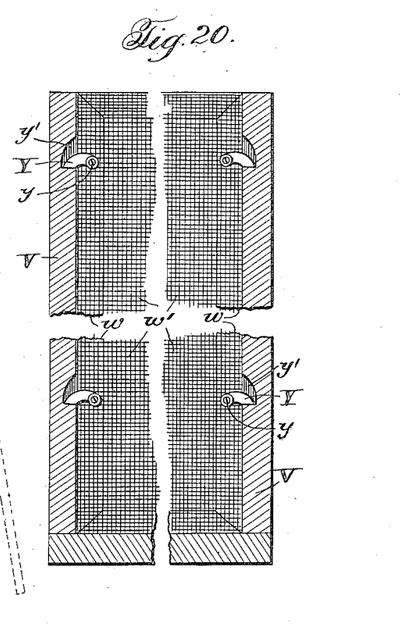
Fig. 20 is a detail sectional view illustrating the manner of removably attaching the filter elements to the frame or casing portion provided for the reception of the same.

I will not claim herein the special construction of the filter *per se*, as illustrated in Figs. 19 and 20, in view of the fact that the same more properly constitutes subject matter for a divisional application.

I claim:

1. A dust collector of the character described, comprising a rotatable element having a multitude of radiating sheets of separating material, and means for causing the sheets to flap to clear the same comprising a rod connected to one edge of each of the sheets, each of said rods having a pair of inwardly extending spring pressed extensions, a member bridging and connecting each pair of extensions located approximately parallel to the first mentioned rod, said bridging members having engaging portions, and camming means in the path of movement of said engaging portions acting in opposition to the springs of said spring pressed extensions, substantially as and for the purpose described.

2. A dust collector of the character described, comprising a casing, a rotatable separating element therein having a rotatable bearing at the end thereof passing through said casing, and means for sealing the space between the casing and said bearing comprising a packing secured to the casing at one edge and at its other edge being free to engage the bearing and provide an outwardly opening receiving portion for holding means, in combination with said holding means comprising a spring member encompassing and overlying the free edge portion of the packing and pressing the latter into sealing engagement with the bearing, said bearing having means normally preventing the escape of the holding spring but permitting the removal of said spring from said bearing and off of the free edge of the packing.

3. A dust collector of the character described comprising a rotatable element having a multitude of sheets of separating material, and means for causing the sheets to flap to clean the same comprising a rod connected to one edge of each of the sheets having extensions thereon, engaging devices carried by said extensions, cams in the path of movement of said engaging devices for actuating the rod and through the rod the said sheet, and means for adjustably supporting the engaging devices on the extensions, substantially as described.

4. A dust collector of the character described comprising a rotatable element having a multitude of sheets of separating material, and means for causing the sheets to flap to clean the same comprising a rod connected to one edge of each of the sheets having extensions thereon, engaging devices carried by said extensions, cams in the path of movement of said engaging devices for actuating the rod and through the rod the said sheet, and means for adjustably supporting the engaging devices on the extensions, comprising split grip-collars adapted to engage the extensions.

5. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, and means for adjustably supporting the engaging devices on the extensions, comprising toothed split grip-collars adapted to engage complementary portions of the extensions.

6. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, means for adjustably supporting the engaging devices on the extensions, and means for actuating the rod in opposition to the cams.

7. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, means for adjustably supporting the engaging devices on the extensions, comprising split grip-collars adapted to engage the extensions, and means for actuating the rod in opposition to the cams.

8. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, means for adjustably supporting the engaging devices on the extensions, comprising toothed split grip-collars adapted to engage complementary portions of the extensions, and means for actuating the rod in opposition to the cams.

9. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, means for adjustably supporting the engaging devices on the extensions, and means for actuating the rod in opposition to the cams, said means including springs mounted on the extensions and bearing against said adjustable means to shift the rod in one direction.

10. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, means for adjustably supporting the engaging devices on the extensions, comprising a split grip-collar adapted to engage the extensions, and means for actuating the rod in opposition to the cams, said means including springs mounted on the extensions and bearing against said collars to shift the rod in one direction.

11. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, means for adjustably supporting the engaging devices on the extensions, comprising toothed split grip-collars adapted to engage complementary portions of the extensions, and means for actuating the rod in opposition to the cams, said means including springs mounted on the extensions and bearing against said collars to shift the rod in one direction.

12. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, means for adjustably supporting the engaging devices on the extensions, and guides for the extensions beyond the engaging members.

13. A dust collector of the character described comprising a rotatable element having a multitude of sheets of separating material, means for causing the sheets to flap to clean the same comprising a rod connected to one edge of each of the sheets having extensions thereon, engaging devices carried by said extensions, cams in the path of movement of said engaging devices for actuating the rod and through the rod the said sheet, means for adjustably supporting the engaging devices on the extensions, and guides for the extensions beyond the engaging members, and springs sleeved on said extensions for actuating the rod in opposition to the cams.

14. In a dust collector of the character described, a separating element comprising a multitude of sheets of separating material, means for securing the same in place, and means for maintaining adjacent sheets in spaced relation comprising an open mesh support between said sheets, members notched to engage and retain the lower edges of said supports independently of fastening devices, and a hollow member receiving the upper ends of each of said supports to permit a slight movement of said supports, substantially as described.

15. In a dust collector of the character described, a separating element comprising a multitude of sheets of separating material, means for securing the same in place, and means for maintaining adjacent sheets in spaced relation comprising an open-mesh support therebetween, and members notched to movably engage the edges of said open-mesh support so that the latter may have face-wise engagement with the sheets, substantially as described.

16. In a dust collector of the character described, a separating element comprising a multitude of sheets of separating material, means for securing the same in place, and means for maintaining adjacent sheets in spaced relation comprising a U-shaped open-mesh support therebetween, members notched to engage the edges of said open-mesh support, and hollow members within which the folded edge of the open-mesh support is received.

17. In a dust collector of the character described, a separating element comprising a multitude of sheets of separating material, means for securing the same in place, and means for maintaining adjacent sheets in spaced relation comprising a U-shaped open-mesh support therebetween, members notched to engage the edges of said open-mesh support, and hollow members within which the folded edge of the open-mesh support is received, the separating cloth passing around the outside of said hollow members.

18. In a dust collector of the character described, a separating element comprising a multitude of sheets of separating material, means for securing the same in place, means for maintaining adjacent sheets in spaced relation comprising a U-shaped open-mesh support therebetween, members notched to engage the edges of said open-mesh support, hollow members within which the folded edge of the open-mesh support is received, the separating cloth passing around the outside of said hollow members, and means for securing the cloth thereto.

19. In a dust collector of the character described, a separating element comprising a multitude of sheets of separating material, means for securing the same in place, means for maintaining adjacent sheets in spaced relation comprising a U-shaped open-mesh support therebetween, members notched to engage the edges of said open-mesh support, hollow members within which the folded edge of the open-mesh support is received, the separating cloth passing around the outside of said hollow members, and means for securing the cloth thereto comprising a plate having prongs passing through the cloth and said member, substantially as described.

20. A dust collector of the character described comprising a separating element consisting of a multitude of folds of a continuous separator cloth, and means for supporting the same including yieldably held bars engaging the outer folds of said material and arranged within said folds and a retaining device overlying the outer portion of the separating element for maintaining the same in position, said retaining element having a portion interengaging with the yieldable bar, substantially as described.

21. A dust collector of the character described comprising a separating element consisting of a multitude of folds of separator cloth, and means for supporting the same including inverted U-shaped bars engaging the outer folds of said material and located therewithin and a supporting element disposed between the folds of the separating element and having its upper edge located within the space between the folds of the U-shaped bar, substantially as described.

22. A dust collector of the character described comprising a rotatable separating element consisting of a multitude of folds of separator cloth, and means for supporting the same including yieldably held bars engaging the outer folds of said material, radially opening guides for the ends of said bars receiving the yieldable members engaging said bars, and retaining devices closing the guideways comprising circumferential bands encompassing the guide members, substantially as described.

23. A dust collector of the character described comprising a separating element consisting of a multitude of folds of separator cloth, and means for supporting the same including yieldably held bars engaging the outer folds of said material, guides for the ends of said bars, and retaining devices closing the guideways, said retaining devices having inwardly extending flanges interposed between the adjacent bars, substantially as described.

24. A dust collector of the character described comprising a separating element consisting of a multitude of folds of separator cloth, and means for supporting the same including yieldably held bars engaging the outer folds of said material, guides for the ends of said bars, and retaining devices closing the guideways, said retaining devices having inwardly extending flanges interposed between the adjacent bars, and extending substantially the full distance between the said adjacent bars, and a packing between said flanges and the guide members.

25. A dust collector of the character described comprising a separator element consisting of a multitude of folds of separator cloth, and means for supporting the folds of said cloth comprising U-shaped bars around the folded edge of which the cloth is passed, and detachable fastening devices overlying the cloth and engaging said bars to fasten the cloth in place.

26. A dust collector of the character described, comprising a separator element consisting of a multitude of folds of separator cloth, and means for supporting the folds of said cloth comprising U-shaped bars around the folded edge of which the cloth is passed, resilient members upon which the ends of said U-shaped bars rest and detachable fastening devices overlying the cloth and engaging said bars to fasten the cloth in place, said bars and overlying devices having separable interlocking parts.

27. A dust collector of the character described, comprising a separator element consisting of a multitude of folds of separator cloth, and means for supporting the folds of said cloth comprising U-shaped bars around the folded edge of which the cloth is passed, and detachable fastening devices overlying the cloth and engaging said bars to fasten the cloth in place, said bars and overlying devices having separable interlocking parts, including tongues on one of the members engaging in recessed portions of the other member and adapted to penetrate the cloth, substantially as described.

28. A dust collector of the character described, comprising a separator element consisting of a multitude of folds of separator cloth, and means for supporting the folds of said cloth comprising U-shaped bars around the folded edge of which the cloth is passed, and detachable fastening devices overlying the cloth and engaging said bars to fasten the cloth in place, said bars and overlying devices having separable interlocking parts, including tongues on one of the members engaging in recessed portions of the other member and adapted to penetrate the cloth, the parts being interlocked and releasable by relative longitudinal movements thereof, substantially as described.

29. A dust collector of the character described, comprising a separator element consisting of a multitude of folds of separator cloth, and means for supporting the folds of said cloth comprising U-shaped bars around the folded edge of which the cloth is passed, and detachable fastening devices overlying the cloth and engaging said bars to fasten the cloth in place, in combination with spacing members for the opposite sides of each fold of the separator cloth located at one edge within the hollow portions of the U-shaped bars, substantially as described.

30. A dust collector of the character described, comprising a separator element consisting of a multitude of folds of separator cloth, and means for supporting the folds of said cloth comprising U-shaped bars around the folded edge of which the cloth is passed, and detachable fastening devices overlying the cloth and engaging said bars to fasten the cloth in place, said bars and overlying devices having separable interlocking parts, in combination with spacing members for the opposite sides of each fold of the separator cloth located at one edge within the hollow portions of the U-shaped bars, substantially as described.

31. A dust collector of the character described, comprising a separator element consisting of a multitude of folds of separator cloth, and means for supporting the folds of said cloth comprising U-shaped bars around the folded edge of which the cloth is passed, and detachable fastening devices overlying the cloth and engaging said bars to fasten the cloth in place, said bars and overlying devices having separable interlocking parts, including tongues on one of the members engaging in recessed portions of the other member and adapted to penetrate the cloth, in combination with spacing members for the opposite sides of each fold of the separator cloth located at one edge within the hollow portions of the U-shaped bars, substantially as described.

32. A dust collector of the character described, comprising a separator element consisting of a multitude of folds of separator cloth, and means for supporting the folds of said cloth comprising U-shaped bars around the folded edge of which the cloth is passed, and detachable fastening devices overlying the cloth and engaging said bars to fasten the cloth in place, said bars and overlying devices having separable interlocking parts, including tongues on one of the members engaging in recessed portions of the other member and adapted to penetrate the cloth, the parts being interlocked and releasable by relative longitudinal movements thereof, in combination with spacing members for the opposite sides of each fold of the separator cloth located at one edge within the hollow portions of the U-shaped bars, substantially as described.

33. A dust collector of the character described comprising a separator element consisting of a multitude of folds of separator cloth, and means for supporting the folds of said cloth comprising U-shaped bars around the folded edge of which the cloth is passed, and detachable fastening devices overlying the cloth and engaging said bars to fasten the cloth in place, the bars and said overlying members being provided with interfitting ribbed and grooved portions, substantially as described.

34. In a dust collector of the character described, a separator element comprising a folded separator cloth, means for shaking the cloth, and reinforcing tape portions secured to the cloth to prevent stretching of the same under the actuation of said shaking means.

35. In a dust collector of the character described, a separator element comprising a folded separator cloth, means for shaking the cloth, and reinforcing tape portions secured to the cloth to prevent stretching of the same under the actuation of said shaking means, in combination with tape portions engaging the shaking means to directly receive the strain thereof.

36. In a dust collector of the character described, a separator element comprising a folded separator cloth, means for shaking the cloth, and continuous reinforcing tape portions passing throughout the various folds of the cloth having portions engaging the shaking means to resist the strain of the latter independently of the cloth, substantially as described.

37. In a dust collector of the character described, a separator element comprising a folded separator cloth, means for shaking the cloth, and continuous reinforcing tape portions passing throughout the various folds of the cloth having loop portions engaging the shaking means to resist the strain of the latter independently of the cloth, substantially as described.

38. A dust collector of the character described comprising a movable separator element consisting of a plurality of sheets of separator cloth, a rod connected to one edge of each of the sheets, means for actuating said rod to cause the sheet to flap comprising extensions on the rod, engaging devices, means in the path of movement of the engaging devices to operate the same, and means for securing the engaging devices to the extensions on the rod comprising a split grip-collar between each engaging device and each extension.

39. A dust collector of the character described comprising a movable separator element consisting of a plurality of sheets of separator cloth, a rod connected to one edge of the cloth, means for actuating said rod to cause the sheet to flap comprising extensions on the rod, engaging devices, means in the path of movement of the engaging devices to operate the same, and means for securing the engaging devices to the extensions on the rod comprising a split grip-collar between each engaging device and each extension, the split grip-devices and extensions having interlocking parts when in normal engaging position.

40. A dust collector of the character described comprising a movable separator element consisting of a plurality of sheets of separator cloth, rods connected to one edge of the cloth, means for actuating said rods to cause the sheets to flap comprising extensions on the rods, engaging devices, means in the path of movement of the engaging devices to operate the same, means for securing the engaging devices to the extensions on the rods comprising a split grip-collar between each engaging device and each extension, the split grip-device and extensions having interlocking parts when in normal engaging position, and means for spreading the split-grip device to release said engagement when the parts are to be adjusted to different relative positions.

41. A dust collector of the character described comprising a movable separator element consisting of a plurality of sheets of separator cloth, rods connected to one edge of the cloth, means for actuating said rods to cause the sheets to flap comprising extensions on the rods, engaging devices, means in the path of movement of the engaging devices to operate the same, means for securing the engaging devices to the extensions on the rods comprising a split grip-collar between each engaging device and each extension, the split grip-device and extensions having interlocking parts when in normal engaging position, and means for spreading the split-grip device to release said engagement when the parts are to be adjusted to different relative positions, said releasing device comprising a wedge engaging the ends of the split-grip device.

42. A dust collector of the character described comprising a movable separator element consisting of a plurality of sheets of separator cloth, rods connected to one edge of the cloth, means for actuating said rods to cause the sheets to flap comprising extensions on the rods, engaging devices, means in the path of movement of the engaging devices to operate the same, means for securing the engaging devices to the extensions on the rods comprising a split grip-collar between each engaging device and each extension, the split-grip-device and extensions having interlocking parts when in normal engaging position, and means for spreading the split-grip device to release said engagement when the parts are to be adjusted to different relative positions, said releasing device comprising a substantially conical threaded wedge engaging complementary threaded portions at the ends of the split-grip device.

43. In a machine of the character described, a movable dust collecting element comprising a multitude of sheets of separator cloth, means for supporting the outer edges of said sheets, and devices associated with said outer edges adapted to displace the sheets whereby they may flap to clean the sheets, in combination with other means for displacing the inner edges of the sheets to correspondingly shape the same, substantially as described.

44. In a machine of the character described, a movable dust collecting element comprising a multitude of radially disposed separating elements, means for resiliently supporting said elements at each of their edges, and means for causing said elements to flap to clean the same upon the rotation thereof, comprising coöperating devices adapted to displace the inner and outer edges of said elements at various times.

45. In a machine of the character described, a movable dust collecting element comprising a plurality of sheets of separator cloth, means for resiliently mounting the outer edges of said sheets, devices associated with the outer edges of said sheets adapted to displace the sheets during a portion of the movement of said element, in combination with means for displacing the inner edges of the sheets to shake the same, substantially as described.

46. In a machine of the character described, a movable dust collecting element comprising a plurality of sheets of separator cloth, means for resiliently mounting the outer edges of said sheets, devices associated with the outer edges of said sheets adapted to displace the sheets during a portion of the movement of said element, in combination with means for displacing the inner edges of the sheets to shake the same, said last mentioned means including a plurality of closely associated cams for repeatedly and rapidly actuating each sheet.

In testimony whereof I affix my signature in presence of two witnesses.

BERNARD KERN, Jr.

Witnesses:
ALVIN H. BIEHL,
C. J. WAGNER.